United States Patent [19]

Adolfsson

[11] 4,275,296
[45] Jun. 23, 1981

[54] STABILIZED FIBER OPTICAL MEASURING APPARATUS

[75] Inventor: Morgan Adolfsson, Vesteras, Sweden

[73] Assignee: ASEA Aktiebolag, Vesteras, Sweden

[21] Appl. No.: 42,954

[22] Filed: May 29, 1979

[30] Foreign Application Priority Data

Jun. 2, 1978 [SE] Sweden ............................. 7806486

[51] Int. Cl.³ .............................................. G02B 5/14
[52] U.S. Cl. ..................................... 250/227; 250/205
[58] Field of Search ............ 250/226, 227, 205, 23 R; 350/96.1, 96.24

[56] References Cited

U.S. PATENT DOCUMENTS

| | | | |
|---|---|---|---|
| 3,282,149 | 11/1966 | Shaw et al. | 250/205 |
| 3,746,452 | 7/1973 | Teboul et al. | 250/227 |
| 4,152,075 | 5/1979 | Rellstab et al. | 250/227 |

*Primary Examiner*—David C. Nelms
*Attorney, Agent, or Firm*—Watson, Cole, Grindle & Watson

[57] ABSTRACT

In a stabilized fiber optical measuring device for measuring dynamic transients of physical magnitudes, a transducer acted upon by the physical magnitude to be measured receives light transmitted by an optical fiber from a light generator and transmits an optical signal to an optical detector. The transducer modulates at least part of the optical input signal such that the optical output signal therefrom contains at least one measuring component representing the magnitude to be measured and at least one stabilization component. The optical output signal is detected and the measuring component and the stabilization component are separated from one another and respective electrical signals generated such that the dependence of the measuring signal on instabilities in the measuring device can be compensated by a compensating signal. The transducer also attenuates the optical input signal in dependence on the magnitude of the measuring component.

12 Claims, 10 Drawing Figures

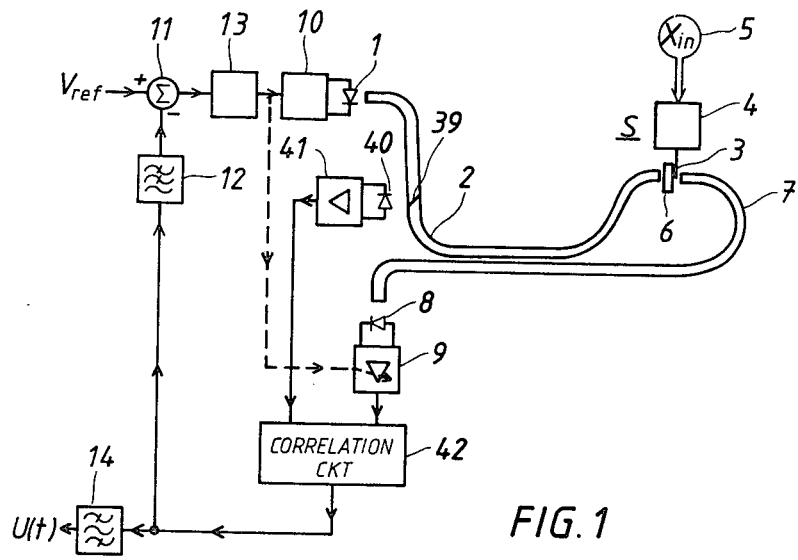
FIG. 1
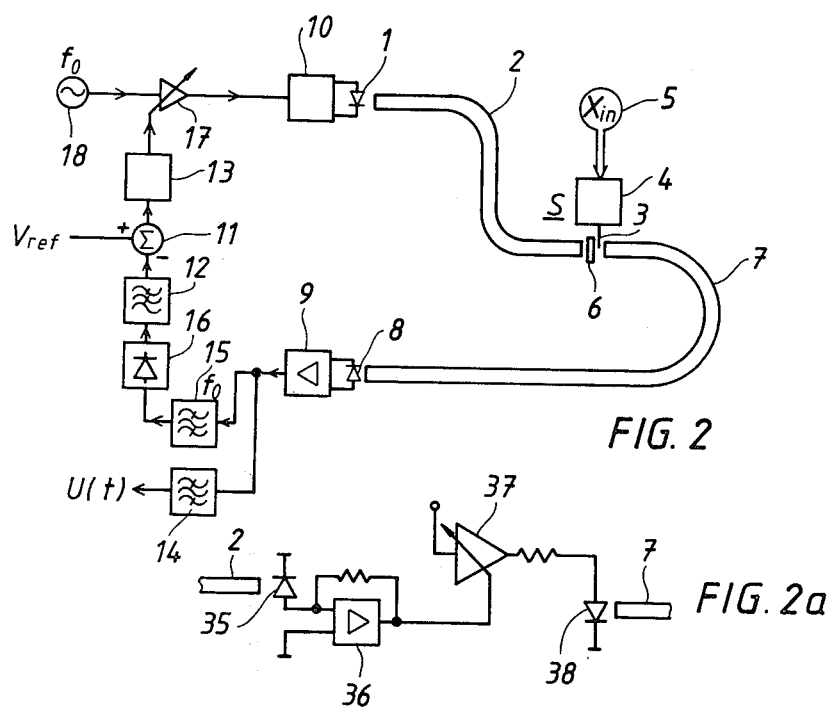
FIG. 2
FIG. 2a

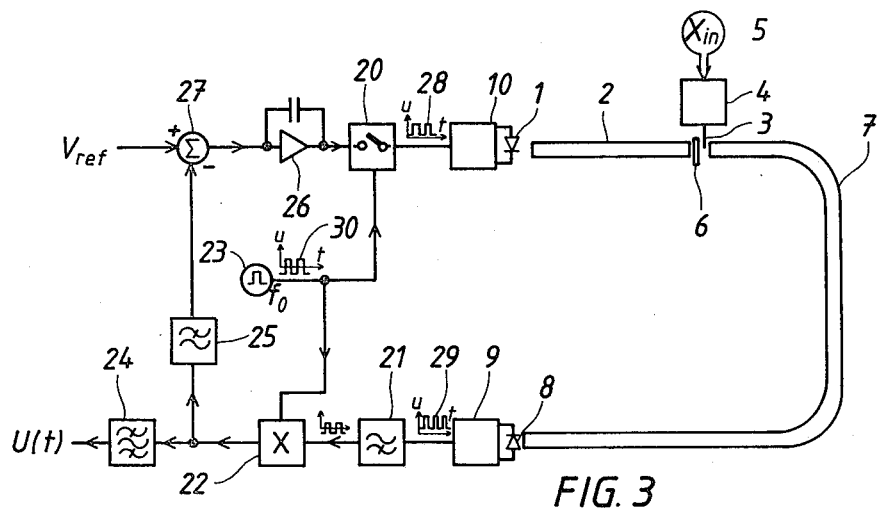
FIG. 3
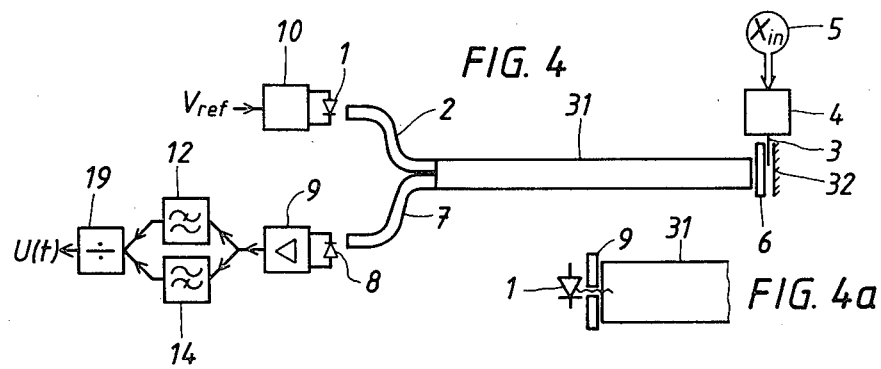
FIG. 4
FIG. 4a
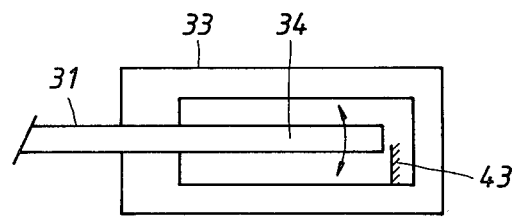
FIG. 5

STABILIZED FIBER OPTICAL MEASURING APPARATUS

BACKGROUND

FIELD OF THE INVENTION

The present invention relates to stabilized fiber optical measuring apparatus having structure, when measuring with analog fiber optical transducers, for compensating the instabilities existing in light-emitting diodes, photo-diodes, photo-current amplifiers, light-emitting diode electronics, optical fibers, fiber contacts, fiber holders, transducer mechanical devices, etc.

SUMMARY OF THE INVENTION

The measuring apparatus according to the invention is intended to be used for fiber optical measurement of different physical magnitudes such as position, acceleration, force, pressure, elongation, temperature, etc. An essential feature of the measuring apparatus is that the light from the transducer is divided into at least two components, one measuring component which contains information about the measuring signal and the status of the optoelectronics, and at least one stabilization component which contains information about the status of the electronics. The measuring component and the stabilization component are separated by electronic filters coupled to the optical detector of the measuring apparatus, and after demodulation of the stabilization component a compensating signal is obtained which is utilized to suppress the dependence of the measuring signal on the above-mentioned instabilities of the measuring apparatus. The measuring signal can thus be obtained by dividing the measuring component and the compensating signal, or as a measuring component directly if the compensating signal controls a regulator for the power to the light source or the amplification of the detector amplifier of the measuring apparatus.

BRIEF DESCRIPTION OF THE DRAWINGS

The measuring device will be described with reference to the accompanying drawings, wherein:

FIG. 1 shows an embodiment of the invention for regulating the light source with a non-periodic signal;

FIG. 2 shows an embodiment of the invention for regulating the light source with a periodic signal;

FIG. 2a shows a modified embodiment using electrical modulation;

FIG. 3 shows a modified embodiment using square wave regulation of the light source;

FIG. 4 shows an embodiment of a transducer arrangement with a bidirectional fiber and divider;

FIG. 4a shows a modified embodiment of a light-emitting diode and a photo-diode arrangement;

FIG. 5 shows a transducer with an optical fiber and a half mirror;

DETAILED DESCRIPTION

Figure 6:
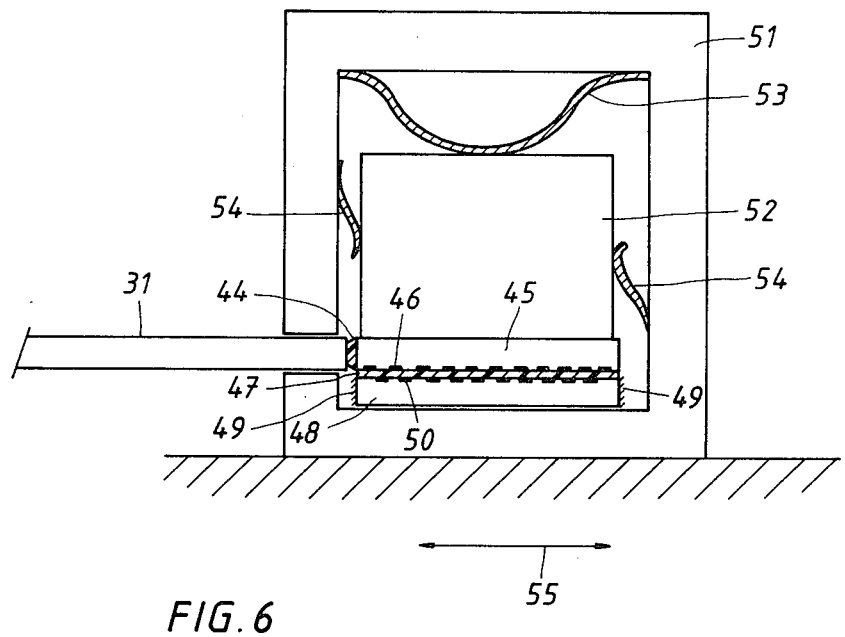
FIG. 6 shows a transducer with an optical fiber and two gratings which are movable relative to each other.

In FIG. 1, light-emitting diode (LED) 1 is arranged to emit a constant light into optical fiber 2 for conducting light to a transducer S. Between the output end of fiber 2 and the input end of fiber 7 for conducting light from the transducer S, there is an air gap, in which screen 3 of transducer S is able to move. Transducer S comprises mechanical system 4 by means of which measuring quantity 5 is transferred into a movement of screen 3, which is located in the air gap. System 4 operates within a specified frequency range and the movement of screen 3 in the air gap gives rise to an intensity modulation of the light into fiber 7. To achieve a linear relationship between the amplitude of movement of screen 3 and the light variation in fiber 7, linearizing gap 6 is arranged in the air gap. Gap 6 may be constructed so that a rectangular beam of rays is obtained, for example, the cross-section of which is determined by how large a portion of the gap is covered by screen 3. The light from fiber 7 is detected by photo-diode 8 and is amplified to a suitable level by amplifier 9. Part of the light in fiber 2 from LED 1 is coupled by oblique joint 39 to photo-diode 40, the photo-current of which is amplified by amplifier 41. A correlation of the outputs of amplifiers 9, 41 is performed in correlation circuit 42, whereby the noise on the output of amplifier 41 is correlated with the noise on the output of amplifier 9 in such a way that the output signal from correlation circuit 42 consists of the detector signal after the noise from LED 1 has been removed by correlation. The simplest method of performing this correlation comprises subtracting the output signal of amplifier 41 from the output signal of amplifier 9 and controlling the amplification of amplifier 41 until a minimum of noise is obtained in the difference signal, which then also constitutes the output signal from correlation circuit 42. The output signal from correlation circuit 42 is supplied both to lowpass filter 12 and to bandpass filter 14, the pass frequency range of which corresponds to the frequency range of system 4. The output signal U(t) from filter 14 constitutes the measuring signal of the measuring apparatus and is compared with reference signal $V_{ref}$ in summation device 11, and the output signal therefrom controls regulator 13, which regulates drive electronics system 10 of LED 1 in such a way that the output signal from filter 12 becomes equal to $V_{ref}$. In that way compensation is obtained for variations of the parameters in electronics system 10, LED 1, optical fiber 2, optical fiber 7, photodiode 8 and amplifier 9. The dashed line from the output of regulator 13 to amplifier 9 indicates how regulator 13 can also control the amplification of amplifier 9, electronics system 10 then being controlled with a constant signal.

The arrangement according to FIG. 1 does not compensate for the zero point drift of the photo-detector. If such compensation is required, alternating light sources are used for both the measuring and the regulating components according to FIG. 2. Parts 1–10 are identical with those of FIG. 1. Drive device 10 for LED 1 is fed by an alternating voltage from oscillator 18 operating at frequency $f_0$ through controllable amplifier 17. The output of amplifier 9 is connected to band-pass filter 15 having pass frequency $f_0$. The filtered signal is rectified in rectifier 16 and is supplied via low-pass filter 12 to summation device 11, where the signal is compared with reference voltage $V_{ref}$. The output signal from summation device 11 is supplied as an error signal to regulator 13 which controls amplifier 17, the output signal of which enters driver 10. LED 1 is controlled so that the output signal from low-pass filter 12 is kept equal to $V_{ref}$. Amplifier 17 controls the amplitude of the alternating signal which is generated by oscillator 18. In its simplest form controllable amplifier 17 may consist of a multiplier circuit or a controllable voltage divider with a field effect transistor, the voltage of which is controlled by regulator 13. The frequency $f_0$ of oscillator 18 is at least twice greater than the highest occurring frequency of the measuring signal to fulfill the sampling thereom. The measuring signal is obtained by demodulation in filter 14 of the output signal from amplifier 9. The frequency $f_0$ can be called the carrier frequency of the measuring apparatus and the carrier wave can be said to be amplitude modulated by the movement of screen 3 in the transducer.

FIG. 2a shows that the measuring signal can consist of an electrical signal. The light from LED 1 passes through optical fiber 2 to photo-diode 35 placed in the transducer, the photo-current of the photo-diode being amplified in amplifier 36 and thereafter supplied to controllable amplifier 37 as a control signal. The measuring voltage $U_m$ is amplified in amplifier 37 and drives LED 38 which sends light into optical fiber 7, to photo-diode 8. The electronics system for producing the measuring signal and regulating of LED 1 is the same as that shown in FIG. 2. The modulation of the signal through optical fiber 1 is performed electrically in this case, instead of mechanically as previously shown.

FIG. 3 shows a measuring device with a somewhat simpler electronics system than that shown in FIG. 2. This can be achieved if the carrier wave consists of square wave 28, which is obtained from the output of analog switch 20. Square wave 29 which is amplitude modulated by the sensor is then obtained from photo-current amplifier 9. This square wave is fed through high-pass filter 21 to multiplier 22 in which the output signal from filter 21 is multiplied by output signal 30 from square wave oscillator 23. The measuring signal is taken out by band-pass filter 24, whereas the status of the optoelectronics is taken out after low-pass filter 25. The upper limit frequency of this filter is chosen lower than the lower limit frequency of the measuring signal. The output signal from low-pass filter 25 and reference signal $V_{ref}$ are compared in summation device 27, from which a difference signal is taken out and supplied to integrator 26 which controls the amplitude of the square wave to driver 10 so that the output signal from filter 25 becomes equal to $V_{ref}$. In this way compensation is ensured for parameter variations of the optocircuitry. Signal 30 from oscillator 23 is used to control switch 20 and the frequency $f_0$ must be chosen at least twice as great as the highest measuring frequency occurring.

The previously described devices are also suited for fiber optical measuring devices having only one fiber between the transducer and the light-emitting and photo-diodes, such as is shown in FIG. 4. The light from LED 1 is switched via fiber 2 into fiber 31, which conducts the light to the transducer. This consists of linearizing column 6 in the air gap in which screen 3 moves, and mirror 32 which reflects part of the emitted light back into fiber 31. Part of the reflected light is also reflected into fiber 7 and thereafter to photo-diode 8. The photo-current from photo-diode 8 is amplified in amplifier 9 and is divided into measuring and stabilization components by filters 14 and 12, respectively. The output signals from the two filters are supplied to divider 19, the output signal of which consists of the quotient between the aforesaid two components and constitutes measuring signal $U(t)$. This quotient formation compensates the measuring signal for instabilities in the optoelectronics and fiber optics. Instead of the illustrated optical Y-connection between fibers 2, 7 and 31, the LED and photo-diode arrangement according to FIG. 4a can be used, resulting in reduced light losses. LED 1 sends light into the center of the end surface of fiber 31, whereas annular photo-diode 9, which is positioned concentrically around the LED, receives the light reflected from mirror 32 into fiber 31.

FIG. 5 shows a modified embodiment of the optical transducer according to FIG. 4. In this embodiment fiber 31 is attached to transducer housing 33 and portion 34 of the fiber located inside the transducer housing is rotatable around the attachment, whereby the end surface of fiber portion 34 moves partly in front of mirror 43. When the fiber end surface moves upwardly, less light is reflected into the fiber, and when the fiber end moves downwardly, more light is reflected back into the fiber. However, the transducer is insensitive to movements perpendicular to the plane of the paper. Since the fiber end functions as a mechanical oscillating system of the second order, the transducer constitutes an optical accelerometer.

Figure 7:
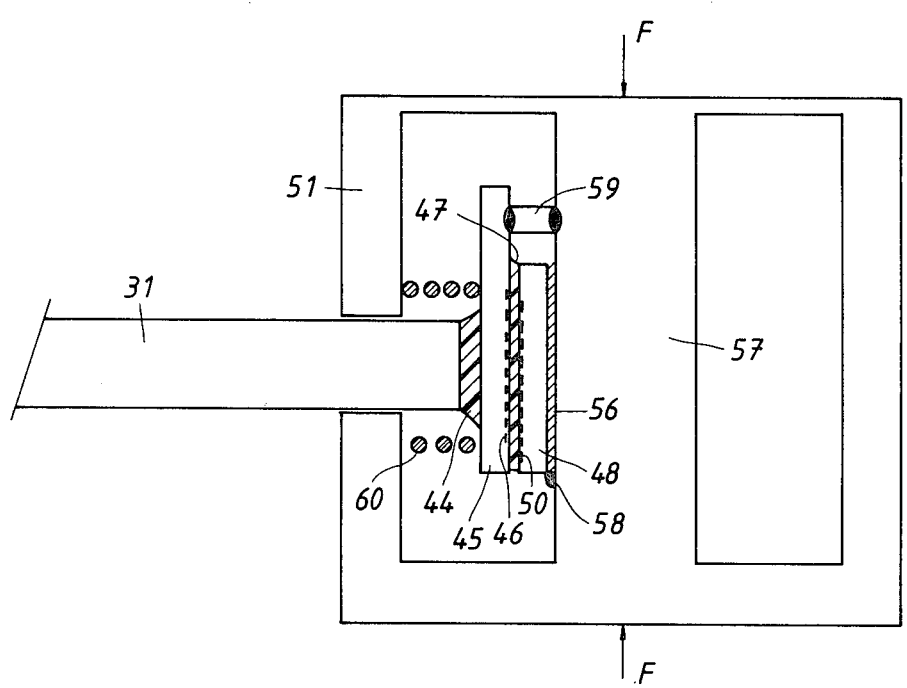
FIG. 7 shows an additional transducer with an optical fiber and two gratings which are movable relative to each other.

To increase the sensitivity, and simultaneously the linearity of the geometrical-optical transducer, the arrangement of gratings according to FIGS. 6 and 7 can be used. According to FIG. 6, the light from fiber 31 is switched via index-matching material 44 to light conducting plate 45 of glass or quartz. Plate 45 is coated on its bottom side with thin reflecting grating 46, for example by means of a vaporization technique. Through this grating part of the light is switched by index-matching material 47 and another grating 50 to light conducting plate 48. Plate 48 is covered on its end surfaces with reflecting layers 49, by means of which the light is reflected back through material 47 to plate 45 and into fiber 31. The amount of light fed back into fiber 31 is determined by the coupling between plates 45 and 48, which in turn is determined by the relative position between gratings 46 and 50. Plate 48 is fixed to the bottom of transducer housing 51 and plate 45 is fixed to movable compound 52, which is pressed downwards by spring 53 to minimize the distance between gratings 46 and 50. Laterally compound 52 is retained by springs 54. The shown and described transducer functions as an accelerometer, which is sensitive in the direction of arrow 55, the gravitational compound 52 and the spring constant being determined by the springs and possibly by index-matching material 47. Alternatively, the light can be switched in from fiber 31 to lower plate 48, upper plate 45 then being provided with short reflecting sides.

FIG. 7 shows that the light from fiber 31 is led into the gratings perpendicular to the surfaces of plates 45 and 48. The light passes via index-matching material 44 into plate 45 and further through grating 46, material 47, grating 50 and plate 48, and is reflected by reflecting surface 56 on the back side of plate 48 and returns through the grating, whereby part of the reflected light is conducted back into fiber 31. Such a transducer functions as a strain gauge. At point 58, plate 48 is attached by its lower end to load cell 57, whereas plate 45 is connected by its upper end to load cell 57 by clamp 59. When a force F acts on load cell 57, the load cell is compressed, whereby gratings 46 and 50 move relative to each other and give rise to a modulation of the light passed in from fiber 31. To minimize the distance between the two gratings, spring 60 is arranged between transducer housing 51 and plate 45.

Figure 8:
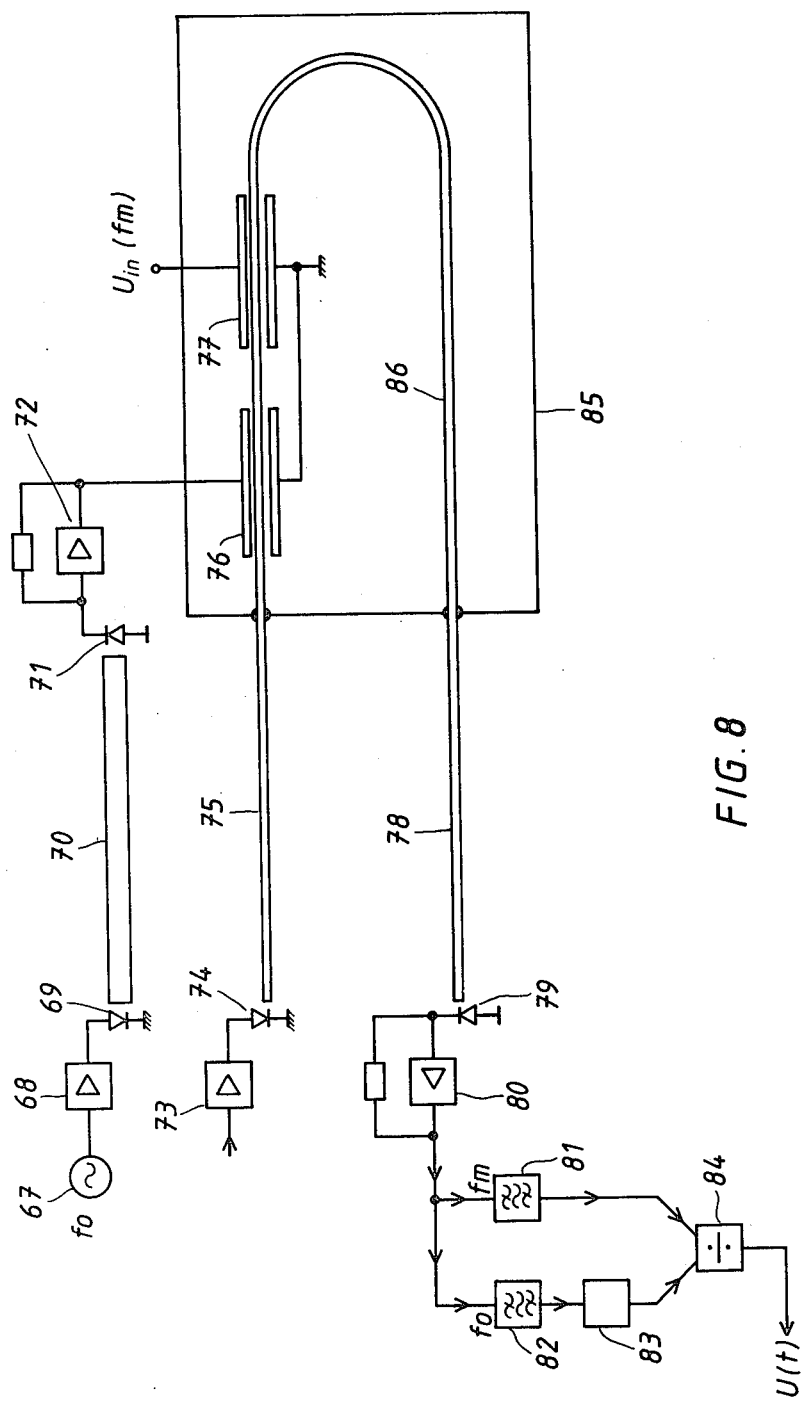
FIG. 8 shows a transducer with optical thin film modulators.

FIG. 8 shows a measuring device having optically thin film modulators 76 and 77, which modulate the light in thin film light conductor 86 in thin film substrate 85. Light from semiconductor laser 74, which is driven from driver 73, is switched into monomode fiber 75, which is connected to light conductor 86 which may be, for example, a Ti-diffused LiNbO₃ crystal. This light is modulated by electro-optical modulators 76 and 77 before being switched over to fiber 78, which conducts the modulated light to photo-detector 79, the photocurrent of which is amplified in amplifier 80. Modulator 77 is controlled by measuring signal $U_{in}$, whereas the other modulator 76 is controlled by photo-diode 71 via current/voltage convertor 72. Photo-diode 71 receives modulated light via fiber 70 from an LED or laser 69, which is driven from driver 68 and oscillator 67 with frequency $f_o$. The received signal which occurs at the output of amplifier 80 is divided into a measuring component and a stabilization component by two band-pass filters 81 and 82, respectively. After demodulation of the stabilization component $f_o$ in demodulator 83 and quotient formation between measuring component $f_m$ and the stabilization signal, which corresponds to the demodulated stabilization component $f_o$, a measuring signal is obtained at the output of divider 84, which measuring signal, through the quotient formation, is compensated for instabilities in the optoelectronics and the fiber optics.

What is claimed is:

1. Stabilized fiber optical measuring device for measuring dynamic transients in physical magnitudes, comprising:
   a transducer acted upon by the physical magnitude to be measured;
   means for generating an optical input signal to said transducer and including at least one light source;
   at least one optical fiber for transmitting light from said means for generating an optical input signal to said transducer and for transmitting the optical output signal from said transducer to said at least one optical detector;
   said transducer including means for modulating at least part of the optical input signal thereto such that the optical output signal therefrom contains at least one measuring component representing the magnitude to be measured and at least one stabilization component which is less dependent on said magnitude than said measuring component said at least one measuring component and said at least one stabilization component being transmitted at least partially in the same optical fiber;
   means for processing the optical signal output of said transducer and including at least one optical detector for detecting said optical output signal and further including means for separating said measuring component and said stabilization component from one another, means for generating a measuring signal and a compensating signal, and means responsive to said compensating signal for reducing the dependence of the measuring signal on instabilities in the measuring device; and
   said means for modulating generating an attenuation of the transmission for the optical input signal and the optical output signal from said transducer, said attenuation being dependent on the magnitude of the measuring component.

2. Stabilized fiber optical measuring device as in claim 1 wherein said means for processing further includes means for demodulating said at least one stabilization component, and means for dividing said at least one stabilization component and at least one measuring component to generate said compensating signal and said measuring signal.

3. Stabilized fiber optical measuring device as in claim 1 wherein said means for processing further includes a regulator responsive to said compensating signal for controlling the energization of said at least one light source.

4. Stabilized fiber optical measuring device as in claim 1 wherein said means for processing further includes a regulator responsive to said compensating signal for controlling the amplification of the output signal of said at least one optical detector.

5. Stabilized fiber optical measuring device as in claim 1 wherein said means for generating an optical input signal includes an oscillator operating at a frequency outside the frequency range of the magnitude being measured, said means for processing further includes filter means tuned to the frequency of said means for oscillating and responsive to the output of said at least one optical detector for generating said at least one stabilizing component and further including another means for filtering responsive to the at least one optical detector for forming said at least one measuring component and suppressing the stabilization component.

6. Stabilized fiber optical measuring device as in claim 1 wherein said means for modulating is a material having light absorption characteristics which, in at least part of the emission spectrum of said at least one light source, is dependent on the magnitude to be measured.

7. Stabilized fiber optical measuring device as in claim 1 wherein said means for modulating includes optical gratings movable relative to one another, the relative movement of said gratings being dependent on the magnitude to be measured and mounted to partially overlap one another, an index matching material in the spaces between said gratings, said gratings being pressed against one another to minimize the thickness of said index matching material.

8. Stabilized fiber optical measuring device as in claim 7 wherein said means for modulating further includes plates of a light conducting material for mounting said optical gratings and said at least one optical fiber is connected to a surface on at least one of said plates.

9. Stabilized fiber optical measuring device as in claim 1 wherein said means for modulating includes a photo-detector for converting said optical input signal into an electrical signal influenced by the magnitude to be measured, and means for converting said electrical signal into an optical output signal.

10. Stabilized fiber optical measuring device as in claim 1 wherein said means for processing further includes a second photo-detector responsive to a part of the optical signal from said at least one light source, and means for correlating the output signal from said first and second photo-detectors to generate a noise suppression signal for suppressing the noise included in the measuring component emanating from said means for generating an optical input signal.

11. Stabilized fiber optical measuring device as in claim 1 wherein said transducer includes a housing and a reflecting surface, said at least one optical fiber transmits both said optical input and said transducer output signals and having an end thereof mounted inside said transducer housing for oscillation of said fiber end in front of said reflecting surface.

12. Stabilized fiber optical measuring device as in claim 1 wherein said means for modulating includes thin optical film modulators.

* * * * *